US010706274B1

(12) United States Patent
Ng et al.

(10) Patent No.: US 10,706,274 B1
(45) Date of Patent: Jul. 7, 2020

(54) SYSTEMS AND METHODS FOR SMOOTH REMOTE POSE RECOVERY UNDER NOISY NETWORK CONDITIONS

(71) Applicant: Glo Big Boss Limited, Kowloon (HK)

(72) Inventors: Kim Wei Ng, Yuen Long (HK); Ka Lok Ng, Kowloon (HK)

(73) Assignee: Glo Big Boss Limited, Kowloon (HK)

( * ) Notice: Subject to any disclaimer, the term of this patent is extended or adjusted under 35 U.S.C. 154(b) by 111 days.

(21) Appl. No.: 16/179,831

(22) Filed: Nov. 2, 2018

(51) Int. Cl.
*G06K 9/00* (2006.01)
*H04N 19/537* (2014.01)
*H04N 19/52* (2014.01)
*G06T 13/20* (2011.01)
*G06T 19/00* (2011.01)
*G06T 7/73* (2017.01)

(52) U.S. Cl.
CPC ......... *G06K 9/00369* (2013.01); *H04N 19/52* (2014.11); *H04N 19/537* (2014.11); *G06K 9/00671* (2013.01); *G06K 2209/40* (2013.01); *G06T 7/73* (2017.01); *G06T 13/20* (2013.01); *G06T 19/006* (2013.01)

(58) Field of Classification Search
CPC ........... G06K 9/00671; G06K 2209/40; G06K 9/00342; G06K 9/00369; G06T 7/246; G06T 7/73; G06T 13/20; G06T 19/006; G06T 7/579; H04N 19/52; H04N 19/537
See application file for complete search history.

(56) References Cited

U.S. PATENT DOCUMENTS

| | | | |
|---|---|---|---|
| 2010/0158331 A1* | 6/2010 | Jacobs | G01S 5/0221 382/128 |
| 2012/0163520 A1* | 6/2012 | Liu | G01D 21/00 375/356 |
| 2015/0154452 A1* | 6/2015 | Bentley | G11B 27/031 386/201 |
| 2015/0310273 A1* | 10/2015 | Shreve | G06T 5/005 382/103 |
| 2016/0050398 A1* | 2/2016 | Li | H04N 19/895 348/158 |
| 2017/0213388 A1* | 7/2017 | Margolis | G06T 19/006 |
| 2018/0211432 A1* | 7/2018 | Hugel | A63F 13/10 |
| 2018/0284802 A1* | 10/2018 | Tsai | G06K 9/00664 |
| 2019/0037244 A1* | 1/2019 | Melkote Krishnaprasad | G06K 9/46 |
| 2019/0114777 A1* | 4/2019 | Maity | G06K 9/00201 |
| 2019/0197196 A1* | 6/2019 | Yang | G06F 30/00 |
| 2020/0111267 A1* | 4/2020 | Stauber | G06F 3/017 |

* cited by examiner

*Primary Examiner* — Margaret G Mastrodonato
(74) *Attorney, Agent, or Firm* — McDermott Will & Emery LLP (57) ABSTRACT

Methods and systems for recovering pose data are provided. The method includes receiving current pose data for a current frame from a data provider, the current pose data including a current data provider timestamp. The method also includes calculating a current latency between the current data provider timestamp and a current data receiver timestamp. The method also includes calculating an expected timestamp for the current frame based on an expected latency between the current frame and a previous frame. The method also includes comparing the expected timestamp with the current data provider timestamp to determine that the pose data was lost. The method also includes recovering the pose data based on the comparing.

20 Claims, 9 Drawing Sheets

OPTIMIZE THE MOVEMENT PREDICTION
BY INERTIAL MEASUREMENT UNIT

SYSTEMS AND METHODS FOR SMOOTH REMOTE POSE RECOVERY UNDER NOISY NETWORK CONDITIONS

TECHNICAL FIELD

The present disclosure generally relates to a motion prediction system, and more specifically relates to recovering pose data under noisy network conditions.

BACKGROUND

Recent advances in computing technology have allowed software developers to capture motion of three-dimensional (3D) objects in real-time. A typical optical motion capture system (or mocap system) tracks markers in a unique configuration in order to reconstruct a pose of 3D object. However, in real world wireless environments, 3D object pose data transmitted from a transmitter may become lost due to noisy network conditions. As a result, a pose of a 3D object is unable to be recovered.

SUMMARY

The present disclosure provides for systems and methods that recover pose data under noisy network conditions.

According to one embodiment of the present disclosure, a computer-implemented method for recovering pose data is provided. The method includes receiving current pose data for a current frame from a data provider, the current pose data including a current data provider timestamp. The method also includes calculating a current latency between the current data provider timestamp and a current data receiver timestamp. The method also includes calculating an expected timestamp for the current frame based on an expected latency between the current frame and a previous frame. The method also includes comparing the expected timestamp with the current data provider timestamp to determine that the pose data was lost. The method also includes recovering the pose data based on the comparing.

According to one embodiment of the present disclosure, a system is provided that includes means for storing instructions, and means for executing the stored instructions that, when executed by the means, cause the means to perform a method for recovering pose data. The method includes receiving current pose data for a current frame from a data provider, the current pose data including a current data provider timestamp. The method also includes calculating a current latency between the current data provider timestamp and a current data receiver timestamp. The method also includes calculating an expected timestamp for the current frame based on an expected latency between the current frame and a previous frame. The method also includes comparing the expected timestamp with the current data provider timestamp to determine that the pose data was lost. The method also includes recovering the pose data based on the comparing.

According to one embodiment of the present disclosure, a system is provided for recovering pose data including a memory storing sequences of instructions, and a processor configured to execute the sequences of instructions, which when executed, causes the processor to perform receiving current pose data for a current frame from a data provider, the current pose data including a current data provider timestamp. The execution of the sequences of instructions also causes the processor to perform calculating a current latency between the current data provider timestamp and a current data receiver timestamp. The execution of the sequences of instructions also causes the processor to perform calculating an expected timestamp for the current frame based on an expected latency between the current frame and a previous frame. The execution of the sequences of instructions also causes the processor to perform comparing the expected timestamp with the current data provider timestamp to determine that the pose data was lost. The execution of the sequences of instructions also causes the processor to perform recovering the pose data based on the comparing.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate aspects of the subject technology, and together with the description serve to explain the principles of the subject technology. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

Virtual and augmented reality games use motion capture (or mocap) data as a source of animation for character models. In many interactive environments such as an escape room game, a game engine runs according to rules of the game by taking into account user movement and presenting an animated display that is responsive to the user movement.

The display of an augmented reality game is generally a video sequence presented to a display capable of displaying the video sequence. The display may be a virtual reality (VR) headset, for example. The video sequence typically includes multiple video frames. By rendering frames in succession according to a sequence order, simulated objects appear to move. The game engine typically generates frames in real-time such as in response to user movements and other user inputs.

The simulated objects can be generated entirely from mathematical models describing the shape of the objects (such as arms and a torso described by a set of plane and/or curve surfaces), generated from stored images (such as the face of a fictitious character), or a combination thereof. It should be noted that if a game engine (or more specifically, a rendering engine that is part of the game engine or used by the gamed engine) has data as to where each object or portion of a flexible object is in a scene, the frame for that scene can be rendered using standard rendering techniques so the more relevant aspect of a game is how to determine where each object is in the scene so that the rendered video sequence is appropriate.

The disclosed system addresses a problem in traditional motion capture systems tied to computer technology, namely the technical problem of tracking a 3D object in real-time and transmitting pose data from a transmitter to a receiver. In real world environments, and especially when capturing the motion of multiple 3D objects in real-time in constrained spaces, environmental noise and/or obstructions cause instability in a communication network utilized for transmitting pose data from a transmitter to a receiver. These circumstances make it difficult to definitively recover a pose of the 3D object. Pose data that is recovered does not account for lost pose data, and results in choppy or jerky animation of the 3D object. The disclosed system solves this technical problem by providing a solution also rooted in computer technology, namely, by predicting and/or interpolating a current pose in a current frame based on previously received pose data.

The disclosed subject technology further provides improvements to the functioning of the computer itself because it saves data storage space, reduces the cost of system resources, reduces bandwidth usage, and improves data quality. Additionally, this overcomes shortcomings associated with current solutions, which are monetarily costly, involve greater system resources, and/or reduce the quality of tracking.

As used herein, the term "frame" generally refers to an image of a video sequence. In some systems, such as interleaved displays, the frame may include multiple fields or more complex constructs, but generally a frame represents a view into a computer-generated scene at a particular time or short time window. For example, with 60 frame-per-second video, if one frame represents the scene at t=0, then the next frame would represent the scene at t=1/60 second. In some cases, a frame may represent the scene from t=0 to t=1/60, but in a simple case, the frame is a snapshot in time.

As used herein, the term "motion capture system" generally refers to an optical marker based system that returns translation (e.g., x-axis, y-axis, z-axis) information from tracked markers, by observing infrared-illuminated markers in a predefined area via multiple cameras.

As used herein, the term "rigid body" generally refers to a unique configuration of markers (e.g., at least three) in the motion capture system. This represents a single tracker that is on a tracked prop or on the limbs of a human.

As used herein, the term "marker" generally refers to the situation when a retroreflective ball is captured by two or more cameras at the same time. The motion capture system will then generate a marker in the observed space. This will later be used to form a rigid body.

Example System Architecture

Figure 1A:
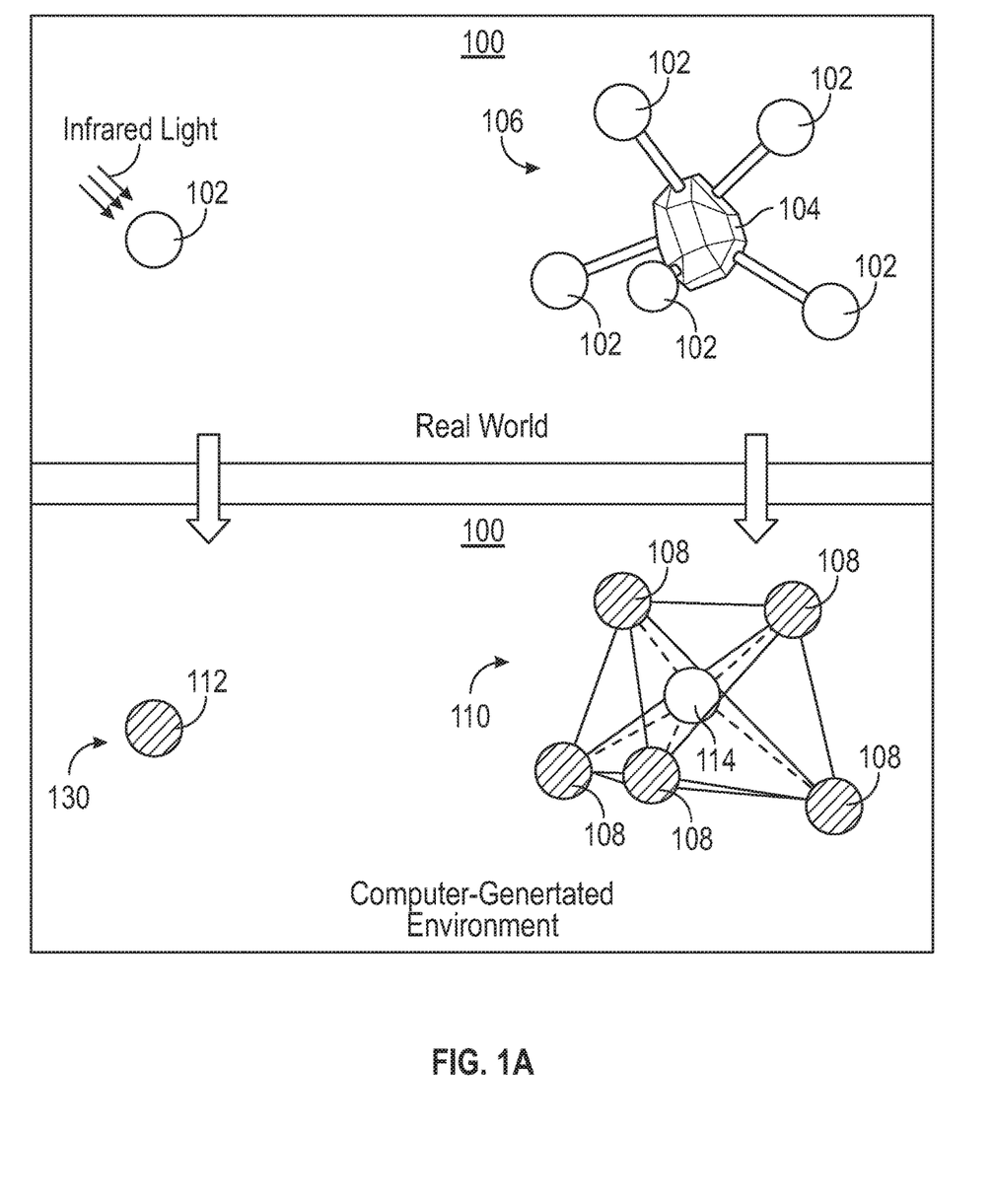
FIG. 1A illustrates an example system for motion capture in a computer-operated imaging environment suitable for practicing some implementations of the disclosure.

FIG. 1A illustrates an example architecture for a motion capture system 100 in a computer-operated optical imaging environment suitable for capturing movement of one or more live actors. As shown, the motion capture system 100 includes balls 102 (e.g., denoted in the FIGS. as unshaded circles) coupled to trackers 104 in unique configurations 106. For example, each unique configuration may represent an identical object in the motion capture system 100, such as a body part or a prop (e.g., a toy gun). In some implementations, five balls 102 are coupled to a tracker 104 to allow for tracking of rotation and pivoting of an object. It will be appreciated that although five balls 102 are shown to be coupled to the tracker 104, other implementations may include a greater or lesser number of such balls 102 and/or arranged in a similar or different configuration, including different shapes and/or different sizes.

In some implementations, the balls 102 are each 19 mm spheres coated with a retroreflective coating on their surfaces. When illuminated by light (e.g., infrared light), the balls 102 illuminate for optical tracking by cameras positioned around a room. In some implementations, the tracker 104 is coupled to a live actor (e.g., a user). The live actor's movements are then captured via the motion of the reflective balls 102 by the cameras. Position data of each ball 102 is input into the motion capture system 100, which allows for tracking of the live actor's movements. The motion capture system 100 processes the position data and recreates a pose of the live actor that is output through a display (e.g., a VR headset). It will be appreciated that in other implementations the balls 102 may be larger or smaller than 19 mm, and there may be different sized balls 102 or the balls 102 may all be the same size.

In some implementations, multiple trackers 104 each having a unique configuration 106 are coupled to the live actor. For example, different trackers 104 with different configurations 106 may be coupled to the live actor's head, left arm, right arm, left foot, and right foot. Recreation of the live actor's pose in a digital format may then be accomplished through tracking of each tracker 104. It will be appreciated that although five trackers 104 are described to be utilized, other implementations may include a greater or lesser number of such trackers 104, and in other implementations the trackers 104 may be coupled to different parts of the live actor's body, clothing (e.g., a bodysuit), VR headset, and/or props.

Once the position data of each ball 102 is input into the motion capture system 100, each ball 102 becomes a marker 130 (e.g., denoted in the FIGS. as shaded circles). If the balls 102 are detected as being attached to the same tracker 104, the balls 102 become labeled markers 108 (e.g., denoted in the FIGS. as shaded circles with interconnecting lines). If the balls 102 are not detected, then they become unlabeled markers (e.g., unlabeled marker 112). Each group of labeled markers 108 comprises a rigid body 110. For example, in the implementation described above, five labeled markers 108 comprise a rigid body 110. A pivot point 114 is also determined, for example, by calculating a center point of all the labeled markers 108. The pivot point 114 becomes the singular reference point of the rigid body 110, containing the full pose (e.g., position and orientation) of the tracker 104, to which all transformations and rotations will be applied. It will be appreciated that although five labeled markers 108 are shown to comprise a rigid body 110, other implementations may include a greater or lesser number of such labeled markers 108 for each rigid body 110, including different numbers of labeled markers 108 for different rigid bodies 110, and in other implementations different shapes and/or different sizes of labeled markers 108.

Figure 1B:
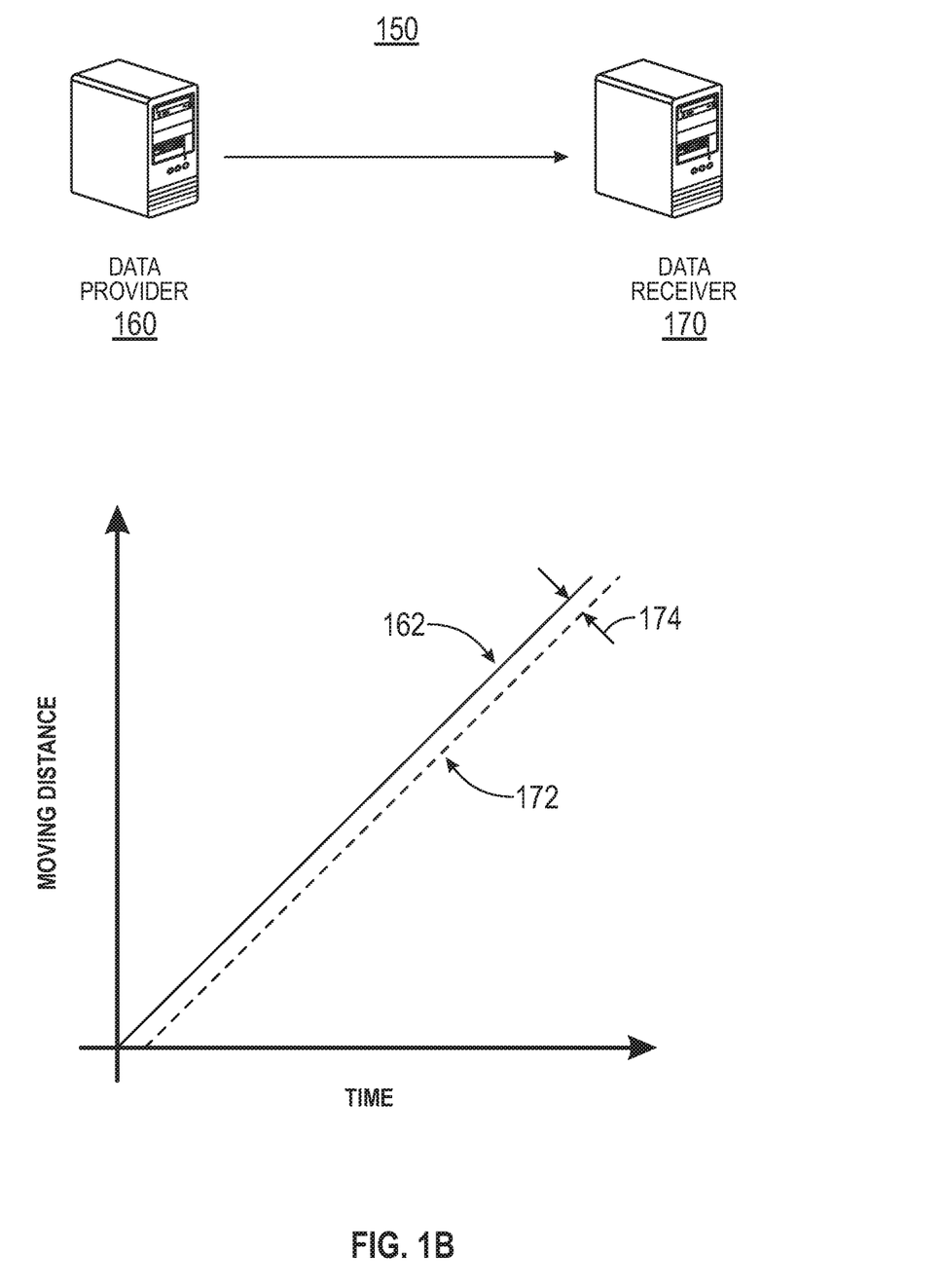
FIG. 1B illustrates an example communication network for motion capture, according to certain aspects of the disclosure.

FIG. 1B illustrates an example communication network 150 for motion capture, according to certain aspects of the disclosure. The communication network 150 includes a data provider 160 and a data receiver 170. The data provider 160 can be coupled to the data receiver 170 through wired or wireless means.

The data provider 160 and the data receiver 170 can be synchronized to send and receive tracked pose data of a moving object via the communication network 150. For example, the data provider 160 transmits pose data 162 to the data receiver 170. In an implementation, the data provider 160 can be synchronized to a movement of an object (e.g., at a constant speed). The data receiver 170 receives the transmitted pose data 162 as received pose data 172, and updates a pose of the object based on the received pose data 172. There is a delay 174 between the transmitted pose data 162 and the received pose data 172 due to network conditions. For example, it takes times to transmit/receive between the data provider 160 and the data receiver 170.

In an ideal lossless environment, the data provider 160 transmits data 162 at a constant rate while the data receiver 170 receives the received data 172 at the same constant rate. As a result, a pose of an object can be updated at a constant rate. However, as will be illustrated below in FIGS. 2 and 3, noisy network conditions and/or environmental obstructions can cause unreliable streams of object pose data.

Figure 2:
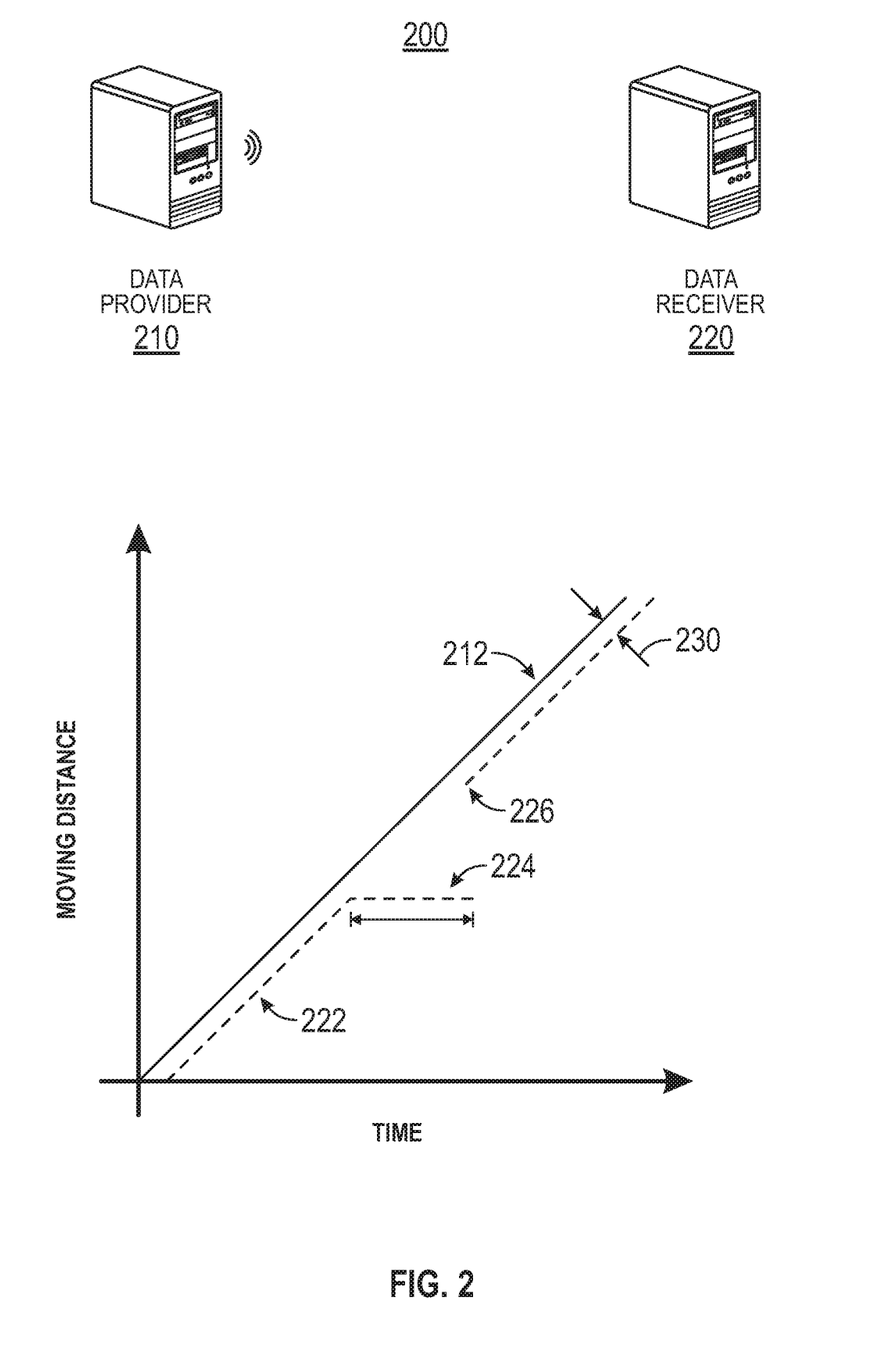
FIG. 2 illustrates an example communication network for motion capture when data is lost due to an unstable network.

FIG. 2 illustrates an example communication network 200 for motion capture when data is lost due to an unstable network. A data provider 210 transmits data 212 to a data receiver 220. The data receiver 220 receives the transmitted data 212 as received data 222 after a delay 230. However, due to unstable network conditions, especially in a wireless network, some data is lost. For example, data is lost because the data receiver 220 does not receive the transmitted data 212 during a time period 224. Although the transmitted data 212 continues to be transmitted at a constant rate, noise and/or environmental obstructions cause the communication network 200 to become unstable. As a result, a pose of an object cannot be updated during the time period 224, and the object will appear in a frozen pose. Additionally, the pose data being transmitted during this time period 224 is lost, because it is never received by the data receiver 220. Once the data receiver 220 begins receiving a steady stream of received data 226 after the time period 224 and updates the pose of the object, the object will appear to have jumped from the frozen pose into a substantially different pose.

Figure 3:
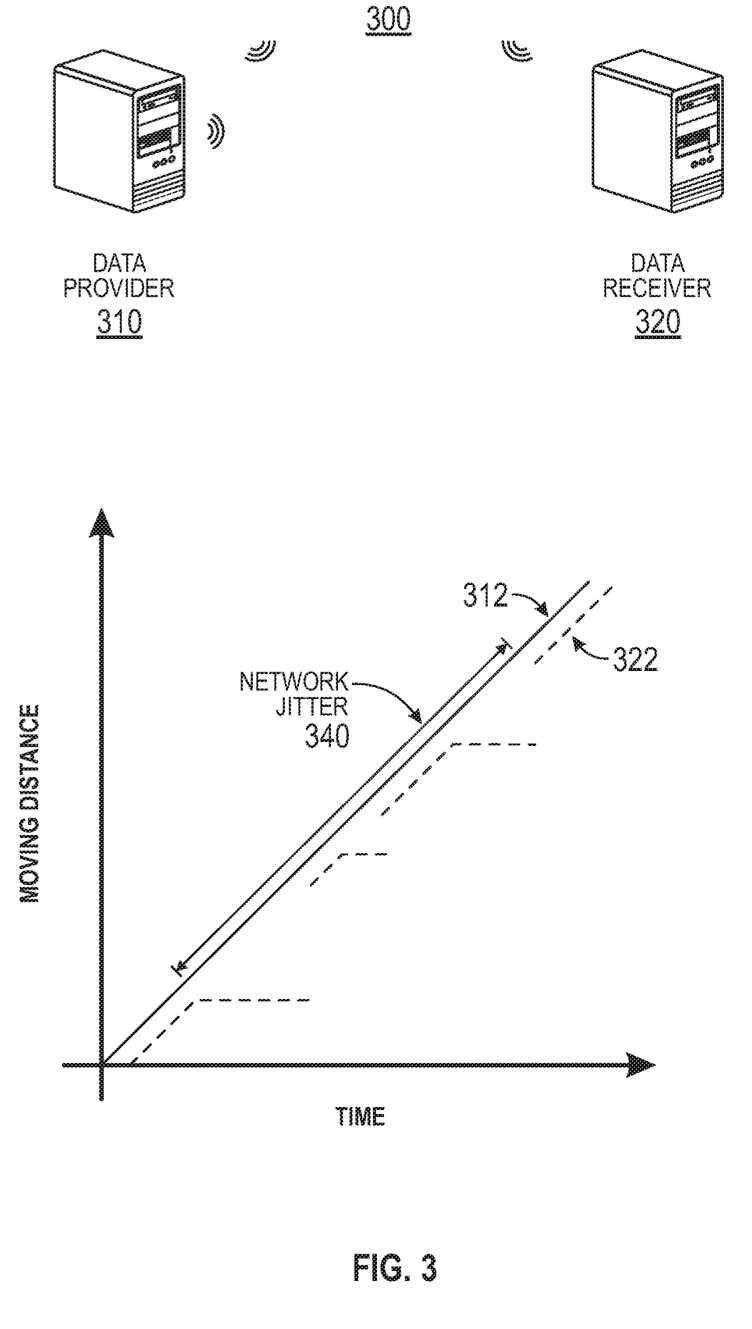
FIG. 3 illustrates an example of a communication network for motion capture when environmental interference causes network jitter.

FIG. 3 illustrates an example of a communication network 300 for motion capture when environmental interference causes network jitter. Similar to the above example, a data provider 310 transmits data 312 to a data receiver 320, which receives the data 312 as data stream 322. Due to jitter 340 caused by random network interference (e.g., noise), the data stream 322 demonstrates the same unreliability as discussed above in relation to FIG. 2. As a result, a pose of an object cannot be consistently tracked and animated, resulting in choppy and/or jerky animation.

Example System for Recovering Pose Data

In order to synchronize 3D object pose data between multiple devices, high frequency data is transferred over a stable network. For example, a data provider device sends continuous object data that includes a system timestamp over the network to a data receiver device. However, as illustrated above in FIGS. 2 and 3, in real world wireless environments, the network can become unstable due to noise and environmental obstructions. As a result, the data receiver receives an unreliable stream of object pose data, which can cause animations to freeze and/or become choppy. Conventional techniques for solving this problem involve optimizing hardware infrastructure and data transmission formats. However, these techniques are costly and involve greater system resources. Therefore, there is a need for systems and methods for ensuring objects continue to animate smoothly under unreliable network conditions.

According to aspects of the present disclosure, systems and methods provide for smooth object animation under unreliable network conditions. This is accomplished by predicting object motion when there is missing pose data, and restoring a path of the object when the network has recovered. In an implementation, previous object pose data is interpolated to predict a current object position. An inertial measurement unit (IMU) can also provide improved accuracy in predicting the current object position.

Figure 4:
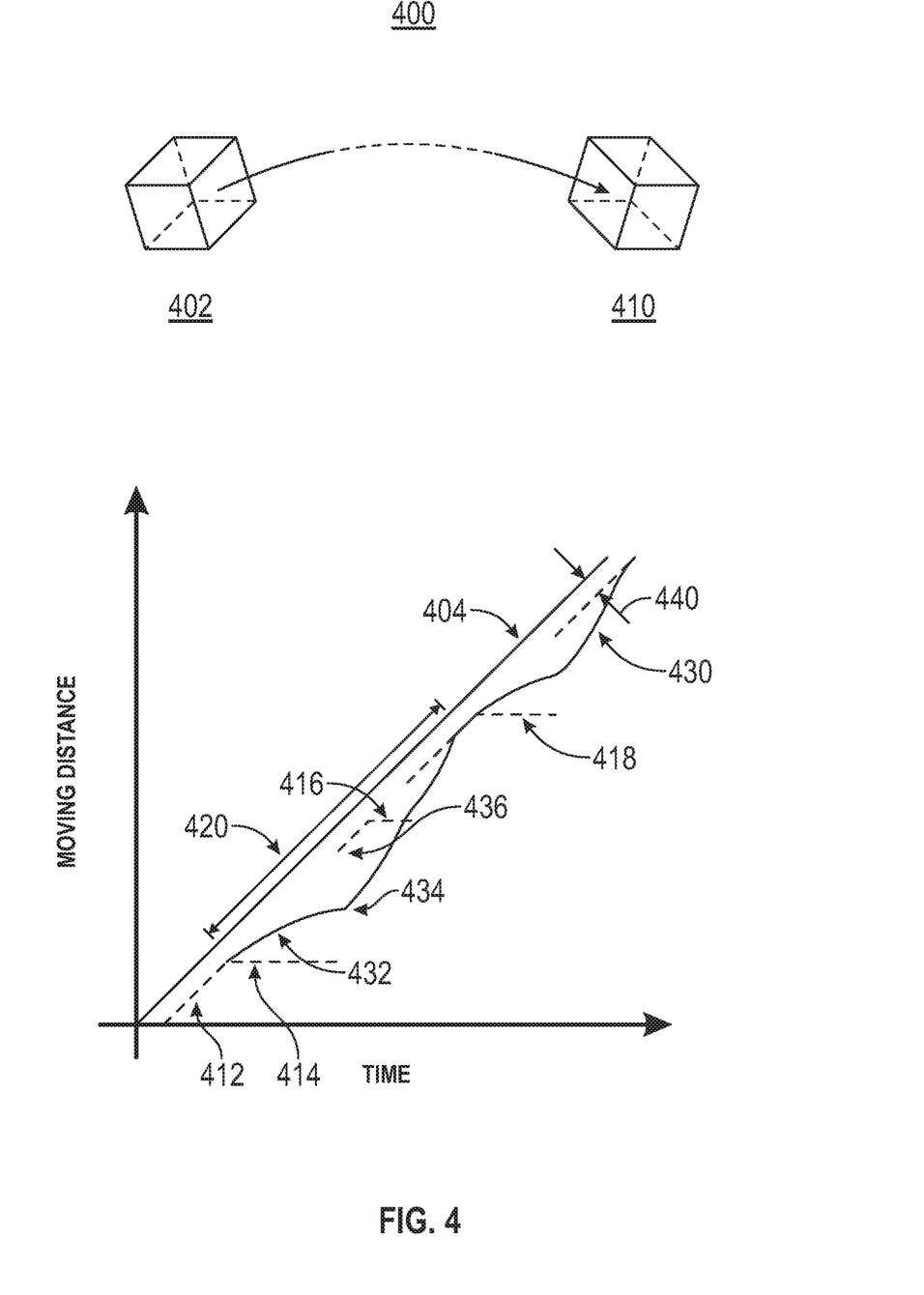
FIG. 4 illustrates an example communication network for recovering pose data, according to certain aspects of the disclosure.

FIG. 4 illustrates an example communication network 400 for recovering pose data, according to certain aspects of the disclosure. For example, a current pose of a currently animated object 410 at a current time (e.g., t=1) is predicted based on a previous pose of a previously animated object 402 at a previous time (e.g., t=0).

According to an aspect, a data provider (e.g., data provider 160 of FIG. 1) transmits a steady stream of object data 404. For example, the stream of object data 404 can include information regarding a pose of a 3D object as the 3D object is tracked through a motion capture system (e.g., motion capture system 100 of FIG. 1A). A data receiver (e.g., data receiver 170 of FIG. 1) receives an interrupted stream of object data 412. As described above in FIGS. 2 and 3, unstable network conditions can cause interruptions that result in the interrupted stream of object data 412. The interrupted stream of object data 412 can be received after a standard delay 440. For example, due to real world conditions relating to transmission and reception of data, the data transferred from the data provider to the data receiver experiences the standard delay 440. The standard delay 440 can be minimal, such as, for example, determined by the speed of light (e.g., $2.99 \times 10^8$ m/s).

As illustrated in the chart, which relates time (t) to a moving distance of an object, the data receiver experiences data loss during at least three time periods (e.g., a first time period 414, a second time period 416, and a third time period 418). During these three time periods, the object is being tracked smoothly and the data provider transmits a smooth stream of data 420.

According to an aspect, when data is lost during the first time period 414, the movement of the object is predicted based on previously received data to generate a first curve 432. A second curve 434 is generated while data is being recovered, such that at network recovery time 436, the movement of the object remains smooth throughout the second time period 416 and throughout the third time period 418. As a result, an overall motion 430 of the object is smoothly generated by the data receiver, despite occurrences of data loss at the first time period 414, the second time period 416, and the third time period 418.

According to an aspect, the data stream 404 includes current data provider pose data. For example, the current data provider pose data includes a current data provider timestamp. The current data can be for a current frame (e.g., k). The data receiver receives the current data provider pose data and timestamps the received data with a current data receiver timestamp. A latency (e.g., a current latency) between the current data provider timestamp and the current data receiver timestamp is calculated and stored. The current data provider pose data and the current data provider timestamp are also stored.

At the first time period 414, data is lost from the data provider. In order to calculate an updated pose without the latest pose data, the current data receiver timestamp, the current data provider timestamp, and the current data provider pose data are retrieved. Previous data provider pose data and a previous data provider timestamp for a previous frame (e.g., k−1) are also retrieved.

In order to compensate for current latency conditions and ensure smoothness, an expected timestamp for the current frame is calculated based on an expected latency between the current frame and the previous frame. For example, the expected timestamp reflects the expected latency at frame k, which should be close in value to the latency in frame k−1 with some decay.

The expected timestamp is compared with the current data provider timestamp to determine that pose data was lost. The pose data is recovered based on the comparison of the expected latency with the current latency. For example, if the expected timestamp is greater than the current data provider timestamp, it means that the network conditions are unreliable, and so a predicted pose is calculated based on previously determined pose data. If the expected timestamp is less than the current data provider timestamp, a ratio of interpolation is calculated based on the expected timestamp, the current data provider timestamp, and a previous timestamp.

The ratio of interpolation ($r_k$) can be calculated from the following equation:

$$r_k = (t_k - t_{k-1}) \div (t_{0Ik} - t_{k-1}) \quad (1)$$

where $t_k$ is the expected timestamp, $t_{k-1}$ is the previous timestamp, and $t_{0Ik}$ is the current data provider timestamp. For example, the previous timestamp can include the previous data provider timestamp and/or the previous data receiver timestamp.

The current pose ($P_k$) can be interpolated from the following equation:

$$P_k = r_k \times P_{0Ik} + (1 - r_k) \times P_{k-1} \quad (2)$$

where $P_{0Ik}$ is the current data provider pose data, and $P_{k-1}$ is the previous data provider pose data.

The calculated current pose and the expected timestamp are stored for use in a next frame (e.g., k+1). The above-described steps can then be repeated for each of the second time period 416 and the third time period 418 until the network interference is resolved.

Figure 5:
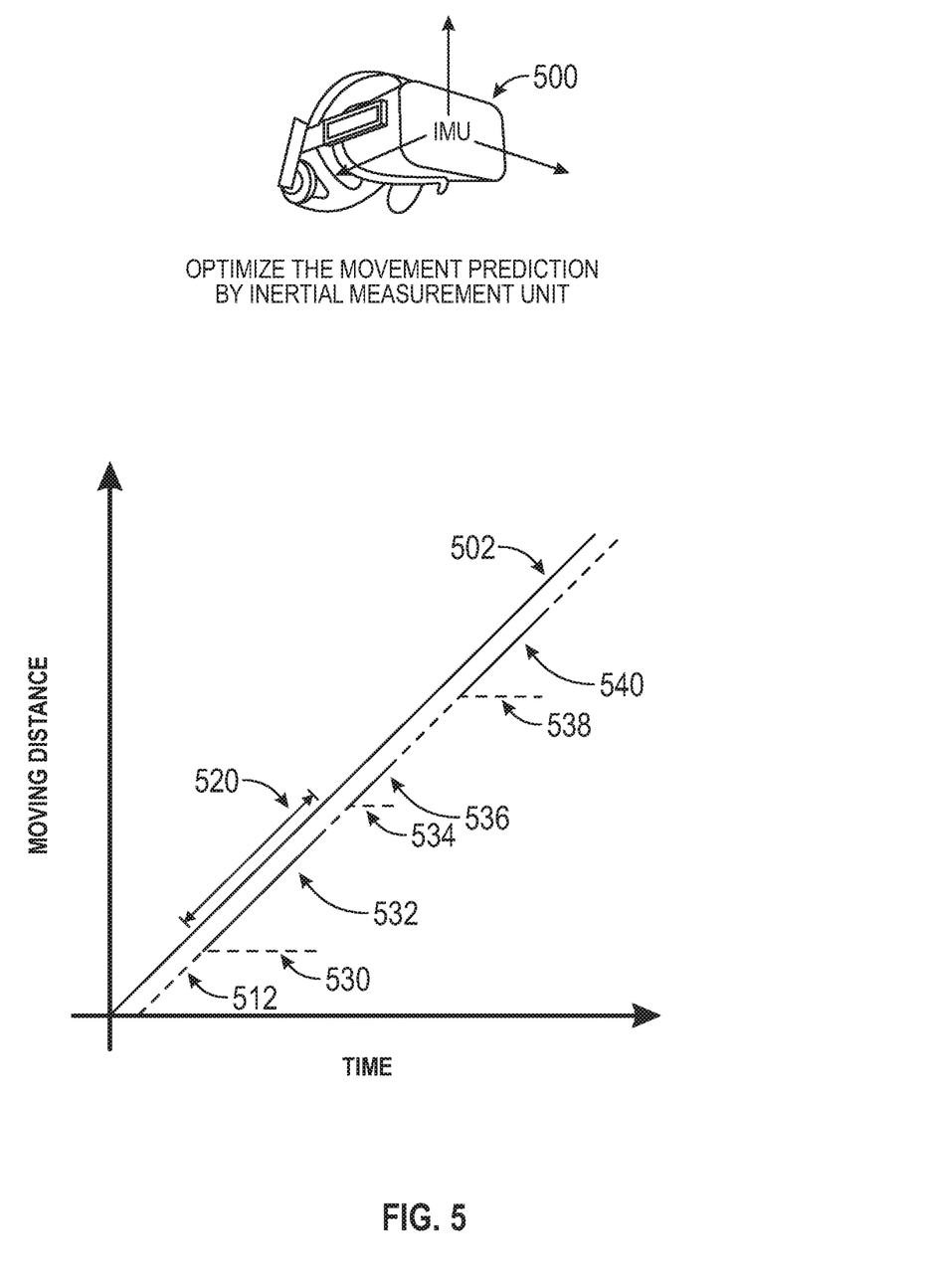
FIG. 5 illustrates an example inertial measurement unit (IMU) for recovering pose data, according to certain aspects of the disclosure.

FIG. 5 illustrates an example inertial measurement unit (IMU) 500 for recovering pose data, according to certain aspects of the disclosure. The IMU 500 can be incorporated into a virtual reality (VR) headset, for example.

Similar to FIG. 4 above, the chart relating time to moving distance shows the relationship between transmitted pose data 502 from a data provider and received pose data 512 at a data receiver. Although a 3D object is being tracked smoothly 520, due to noisy network conditions, the data receiver loses pose data at a first time period 530, a second time period 534, and a third time period 538. A predicted movement of the 3D object can be determined through interpolation, as described above in relation to FIG. 4. Additionally, the IMU 500 can be utilized to provide a more accurate prediction of object movement. For example, data gathered by the IMU 500 during the blackout periods (e.g., the first time period 530, the second time period 534, and the third time period 538) can supplement the data used for interpolation to provide higher accuracy. As a result, a predicted motion of the object can be perfectly determined, such that the resulting predicted periods (e.g., a first period 532, a second period 536, and a third period 540) are substantially linear with no data loss.

The techniques described herein may be implemented as method(s) that are performed by physical computing device(s), as one or more non-transitory computer-readable storage media storing instructions (e.g., stored sequences of instructions) which, when executed by computing device(s), cause performance of the method(s), or, as physical computing device(s) that are specially configured with a combination of hardware and software that causes performance of the method(s).

Figure 6:
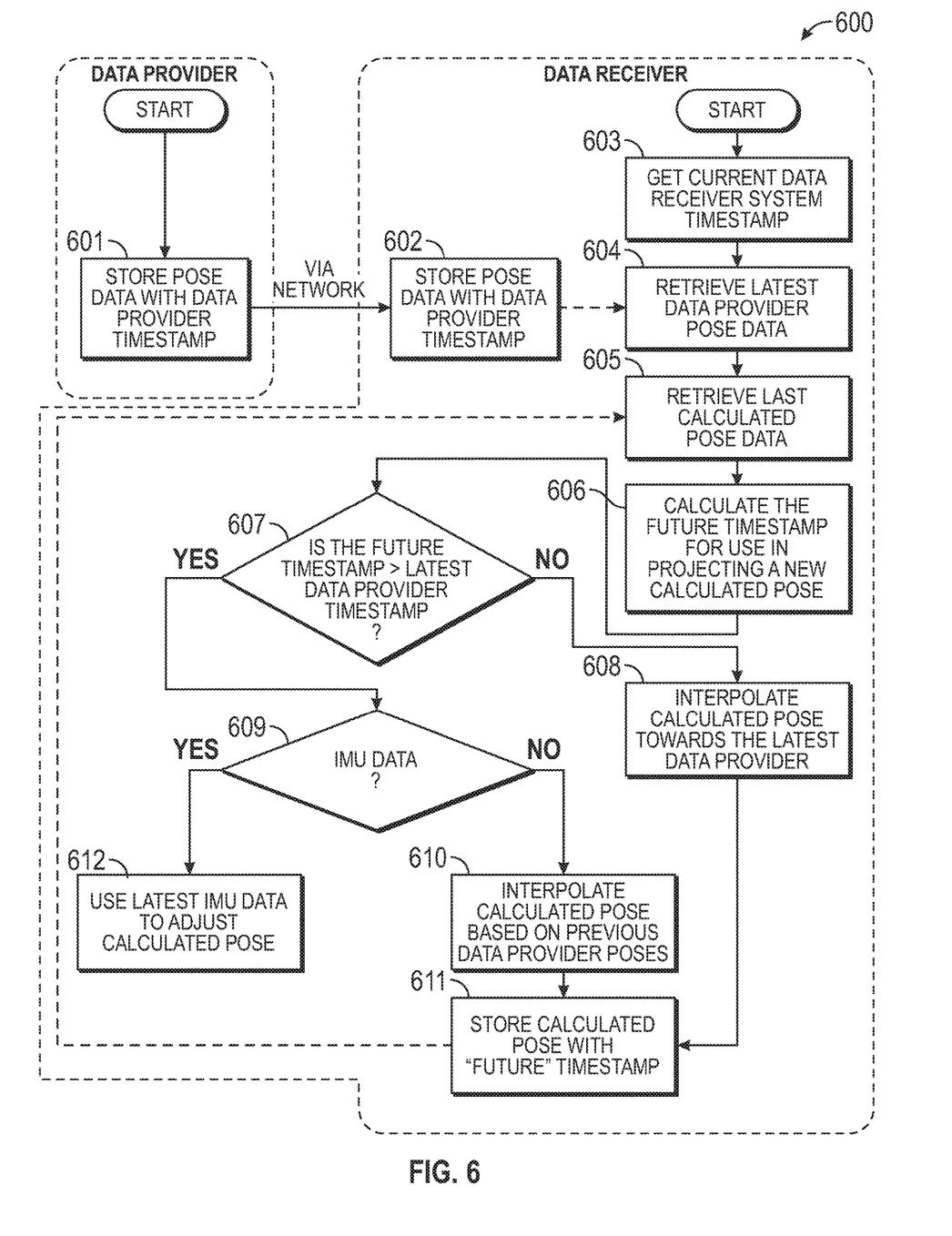
FIG. 6 illustrates an example flow diagram for recovering pose data, according to certain aspects of the disclosure.

FIG. 6 illustrates an example flow diagram 600 for recovering pose data, according to certain aspects of the disclosure. For explanatory purposes, the example process 600 is described herein with reference to the motion capture system 100 of FIG. 1A and the communication network 400 of FIG. 4. Further for explanatory purposes, the blocks of the example process 600 are described herein as occurring in serial, or linearly. However, multiple blocks of the example process 600 may occur in parallel. In addition, the blocks of the example process 600 need not be performed in the order shown and/or one or more of the blocks of the example process 600 need not be performed. For purposes of explanation of the subject technology, the process 600 will be discussed in reference to FIGS. 1A and 4.

At block 601, data provider pose data is stored at a data provider with a data provider timestamp. The data provider pose data and the data provider timestamp are transmitted via a network (e.g., a wired or wireless network) to a data receiver.

At block 602, the data provider pose data and the data provider timestamp are stored at the data receiver. At block 603, a current data receiver timestamp is determined. At block 604, latest data provider pose data is retrieved. At block 605, last calculated pose data is retrieved. At block 606, a future timestamp for use in projecting a new calculated pose is calculated.

At block 607, it is determined whether the future timestamp is greater than the latest data provider timestamp. If no, then at block 608 interpolation is utilized to calculate a predicted pose, and at block 611 the calculated predicted pose is stored with the further timestamp. The process 600 then returns to block 605.

If yes, then at block 609 it is determined whether an IMU has been utilized to obtain supplemental data. If yes, then at block 612 the latest IMU data is utilized to adjust a calculated pose. If no, then at block 610 interpolation is utilized to calculate a predicted pose based on previous data provider pose data. The process 600 then proceeds to blocks 611 and 605 as described above.

Figure 7:
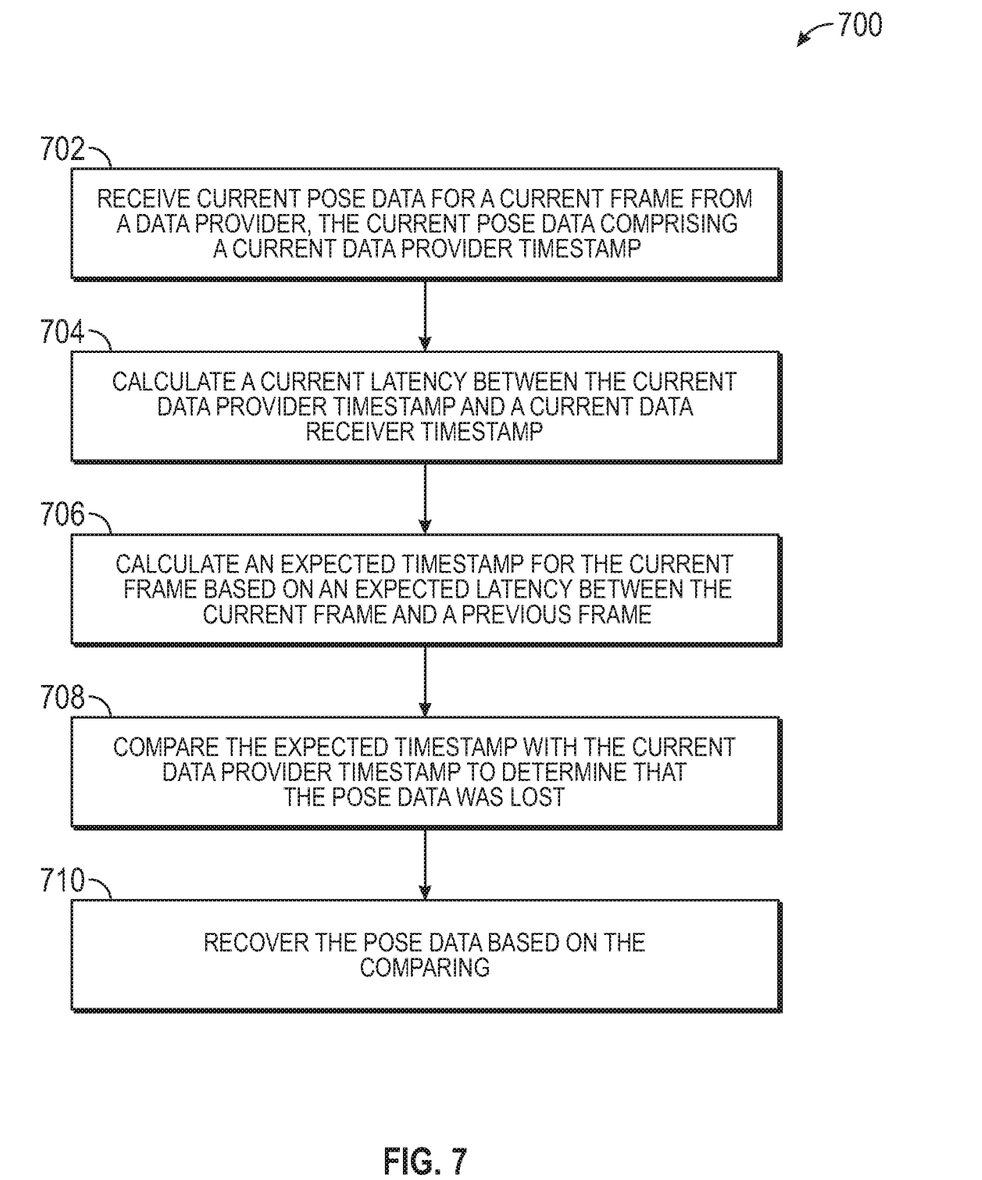
FIG. 7 illustrates an example flow diagram for recovering pose data, according to certain aspects of the disclosure.

FIG. 7 illustrates an example flow diagram 700 for recovering pose data, according to certain aspects of the disclosure. For explanatory purposes, the example process 700 is described herein with reference to the motion capture system 100 of FIG. 1A and the communication network 400 of FIG. 4. Further for explanatory purposes, the blocks of the example process 700 are described herein as occurring in serial, or linearly. However, multiple blocks of the example process 700 may occur in parallel. In addition, the blocks of the example process 700 need not be performed in the order shown and/or one or more of the blocks of the example process 700 need not be performed. For purposes of explanation of the subject technology, the process 700 will be discussed in reference to FIGS. 1A and 4.

At block 702, current pose data for a current frame is received from a data provider. The current pose data includes a current data provider timestamp. At block 704, a current latency between the current data provider timestamp and a current data receiver timestamp is calculated. At block 706, an expected timestamp for the current frame is calculated based on an expected latency between the current frame and a previous frame. At block 708, the expected timestamp is compared with the current data provider timestamp to determine that the pose data was lost. At block 710, the pose data is recovered based on the comparison of the expected timestamp and the current data provider timestamp.

According to an aspect, recovering the pose data includes calculating a predicted pose based on previously determined pose data for the previous frame when the expected timestamp is greater than the current data provider timestamp.

According to an aspect, recovering the pose data includes calculating a ratio of interpolation based on the current data receiver timestamp, the current data provider timestamp, and a previous timestamp when the expected timestamp is less than the current data provider timestamp.

According to an aspect, calculating the ratio of interpolation includes calculating a difference between the expected timestamp and the previous timestamp, and calculating a difference between the current data provider timestamp and the previous timestamp.

According to an aspect, the process 700 further includes storing the current pose data, the current data provider timestamp, and the current latency.

According to an aspect, the process 700 further includes retrieving the current data receiver timestamp.

According to an aspect, the process 700 further includes retrieving previous pose data for the previous frame received from the data provider, the previous pose data including a previous timestamp.

Hardware Overview

Figure 8:
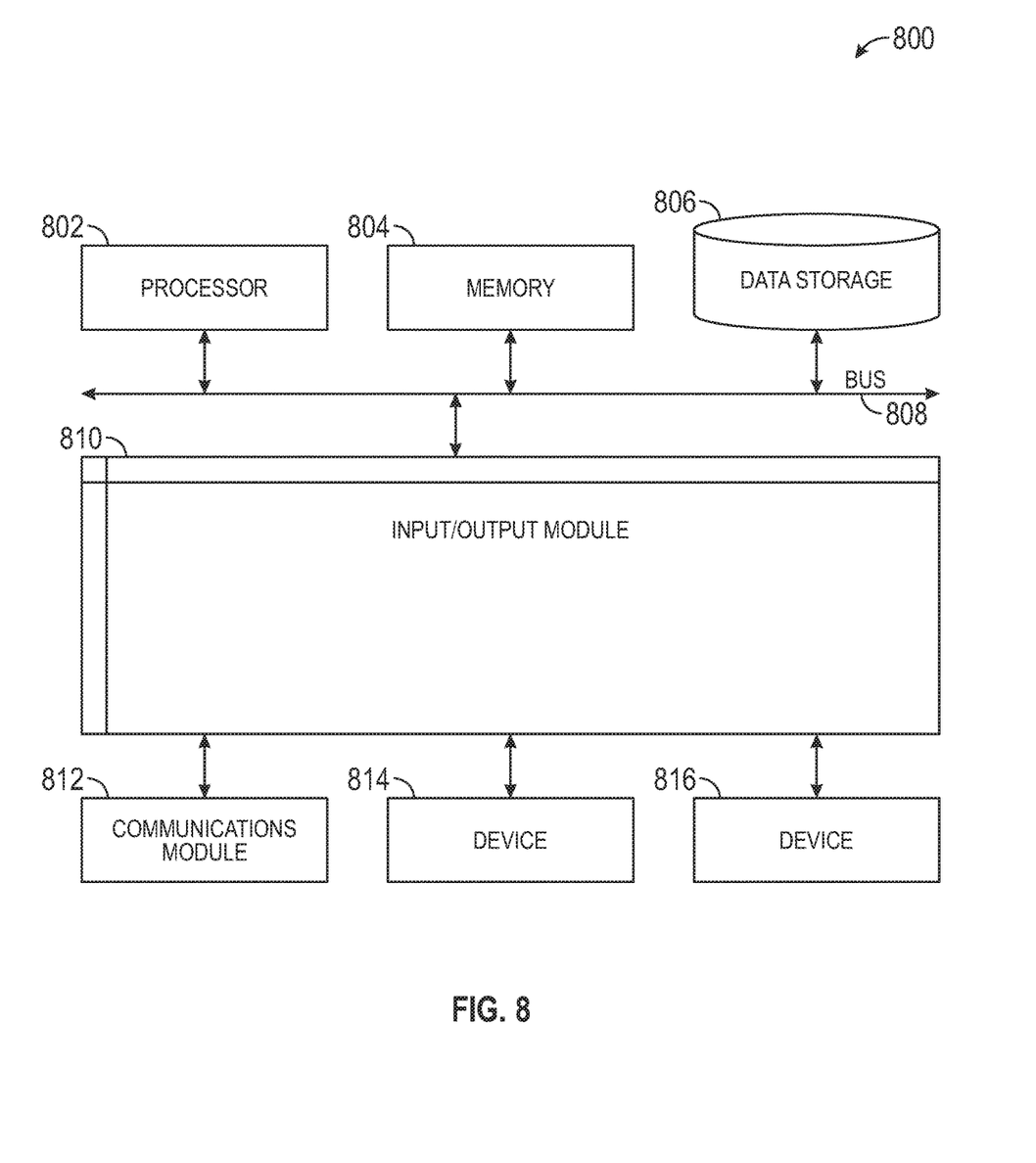
FIG. 8 is a block diagram illustrating an example computer system with which aspects of the subject technology can be implemented.

FIG. 8 is a block diagram illustrating an example computer system 800 with which a motion capture system 100 of FIG. 1 and a communication network 400 of FIG. 4 can be implemented. In certain aspects, the computer system 800 may be implemented using hardware or a combination of software and hardware, either in a dedicated server, or integrated into another entity, or distributed across multiple entities.

Computer system 800 (e.g., motion capture system 100 and communication network 400) includes a bus 808 or other communication mechanism for communicating information, and a processor 802 coupled with bus 808 for processing information. According to one aspect, the computer system 800 can be a cloud computing server of an IaaS that is able to support PaaS and SaaS services. According to one aspect, the computer system 800 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques. By way of example, the computer system 800 may be implemented with one or more processors 802. Processor 802 may be a general-purpose microprocessor, a microcontroller, a Digital Signal Processor (DSP), an ASIC, an FPGA, a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry. Expansion memory may also be provided and connected to computer system 800 through input/output module 810, which may include, for example, a SIMM (Single In Line Memory Module) card interface. Such expansion memory may provide extra storage space for computer system 800, or may also store applications or other information for computer system 800. Specifically, expansion memory may include instructions to carry out or supplement the processes described above, and may include secure information also. Thus, for example, expansion memory may be provided as a security module for computer system 800, and may be programmed with instructions that permit secure use of computer system 800. In addition, secure applications may be provided via the SIMM cards, along with additional information, such as placing identifying information on the SIMM card in a non-hackable manner.

The instructions may be stored in the memory 804 and implemented in one or more computer program products, e.g., one or more modules of computer program instructions encoded on a computer readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, with languages, embeddable languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. The input/output module 810 can be any input/output module. Example input/output modules 810 include data ports such as USB ports. In addition, input/output module 810 may be provided in communication with processor 802, so as to enable near area communication of computer system 800 with other devices. The input/output module 810 may provide, for example, wired communication in some implementations, or wireless communication in other implementations, and multiple interfaces may also be used. The input/output module 810 is configured to connect to a communications module 812. Example communications modules 812 include networking interface cards, such as Ethernet cards and modems.

The components of the system can be interconnected by any form or medium of digital data communication (e.g., a communication network). The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 812 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time Division Multiple Access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 812 sends and receives electrical, electromagnetic, or optical signals that carry digital data streams representing various types of information. The network link typically provides data communication through one or more networks to other data devices. For example, the network link of the communications module 812 may provide a connection through local network to a host computer or to data equipment operated by an Internet Service Provider (ISP). The ISP in turn provides data communication services through the world wide packet data communication network now commonly referred to as the "Internet." The local network and Internet both use electrical, electromagnetic, or optical signals that carry digital data streams. The signals through the various networks and the signals on the network link and through communications module 812, which carry the digital data to and from computer system 800, are example forms of transmission media.

Computer system 800 can send messages and receive data, including program code, through the network(s), the network link, and communications module 812. In the Internet example, a server might transmit a requested code for an application program through the Internet, the ISP, the local network, and communications module 812. The received code may be executed by processor 802 as it is received, and/or stored in data storage 806 for later execution.

In certain aspects, the input/output module 810 is configured to connect to a plurality of devices, such as an input device 814 and/or an output device 816. Example input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Example output devices 816 include display devices, such as an LED (light emitting diode), CRT (cathode ray tube), LCD (liquid crystal display) screen, a TFT LCD (Thin-Film-Transistor Liquid Crystal Display), or an OLED (Organic Light Emitting Diode) display, for displaying information to the user. The output device 816 may comprise appropriate circuitry for driving the output device 816 to present graphical and other information to a user.

According to one aspect of the present disclosure, the motion capture system 100 and/or the communication network 400 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. Processor 802 may process the executable instructions and/or data structures by remotely accessing the computer program product, for example by downloading the executable instructions and/or data structures from a remote server through communications module 812 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects, a user of systems and methods as disclosed herein may perform at least some of the steps by accessing a cloud server through a network connection. Further, data files, circuit diagrams, performance specifications, and the like resulting from the disclosure may be stored in a database server in the cloud-computing environment, or may be downloaded to a private storage device from the cloud-computing environment.

Computing system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a personal digital assistant (PDA), a mobile audio player, a Global Positioning System (GPS) receiver, and/or a television set top box.

The term "machine-readable storage medium" or "computer-readable medium" as used herein refers to any medium or media that is provided including instructions or data to processor 802 for execution. The term "storage medium" as used herein refers to any non-transitory computer readable storage medium that stores data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 806. Volatile media include dynamic memory, such as memory 804. Transmission media include coaxial cables, copper wire, and fiber optics, including the wires that comprise bus 808. Common forms of machine-readable media include, for example, a floppy disk, a flexible disk, a hard disk, magnetic tape, any other magnetic medium, a CD-ROM, a DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire, and fiber optics, including the wires that comprise bus 808. Transmission media can also take the form of acoustic or light waves, such as those generated during radio-wave and infra-red data communications. Furthermore, as used in this specification of this application, the terms "computer," "server," "processor," and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first, second, and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately, or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for recovering pose data, comprising:
    receiving current pose data for a current frame from a data provider, the current pose data comprising a current data provider timestamp;
    calculating a current latency between the current data provider timestamp and a current data receiver timestamp;
    calculating an expected timestamp for the current frame based on an expected latency between the current frame and a previous frame;
    comparing the expected timestamp with the current data provider timestamp to determine that the pose data was lost; and
    recovering the pose data based on the comparing.

2. The computer-implemented method of claim 1, wherein recovering the pose data comprises:
    calculating a predicted pose based on previously determined pose data for the previous frame when the expected timestamp is greater than the current data provider timestamp.

3. The computer-implemented method of claim 1, wherein recovering the pose data comprises:
    calculating a ratio of interpolation based on the current data receiver timestamp, the current data provider timestamp, and a previous timestamp when the expected timestamp is less than the current data provider timestamp.

4. The computer-implemented method of claim 3, calculating the ratio of interpolation comprises:
    calculating a difference between the expected timestamp and the previous timestamp; and
    calculating a difference between the current data provider timestamp and the previous timestamp.

5. The computer-implemented method of claim 1, further comprising:
storing the current pose data, the current data provider timestamp, and the current latency.

6. The computer-implemented method of claim 1, further comprising:
retrieving the current data receiver timestamp.

7. The computer-implemented method of claim 1, further comprising:
retrieving previous pose data for the previous frame received from the data provider, the previous pose data comprising a previous timestamp.

8. A system for recovering pose data, comprising:
a memory storing sequences of instructions; and
a processor configured to execute the sequences of instructions which, when executed, causes the processor to perform:
receiving current pose data for a current frame from a data provider, the current pose data comprising a current data provider timestamp;
calculating a current latency between the current data provider timestamp and a current data receiver timestamp;
calculating an expected timestamp for the current frame based on an expected latency between the current frame and a previous frame;
comparing the expected timestamp with the current data provider timestamp to determine that the pose data was lost; and
recovering the pose data based on the comparing.

9. The system of claim 8, further comprising stored sequences of instructions, which when executed by the processor, cause the processor to perform:
calculating a predicted pose based on previously determined pose data for the previous frame when the expected timestamp is greater than the current data provider timestamp.

10. The system of claim 8, further comprising stored sequences of instructions, which when executed by the processor, cause the processor to perform:
calculating a ratio of interpolation based on the current data receiver timestamp, the current data provider timestamp, and a previous timestamp when the expected timestamp is less than the current data provider timestamp.

11. The system of claim 10, further comprising stored sequences of instructions, which when executed by the processor, cause the processor to perform:
calculating a difference between the expected timestamp and the previous timestamp; and
calculating a difference between the current data provider timestamp and the previous timestamp.

12. The system of claim 8, further comprising stored sequences of instructions, which when executed by the processor, cause the processor to perform:
storing the current pose data, the current data provider timestamp, and the current latency.

13. The system of claim 8, further comprising stored sequences of instructions, which when executed by the processor, cause the processor to perform:
retrieving the current data receiver timestamp.

14. The system of claim 8, further comprising stored sequences of instructions, which when executed by the processor, cause the processor to perform:
retrieving previous pose data for the previous frame received from the data provider, the previous pose data comprising a previous timestamp.

15. A non-transitory computer readable storage medium is provided including instructions that, when executed by a processor, cause the processor to perform a method for recovering pose data, the method comprising:
receiving current pose data for a current frame from a data provider, the current pose data comprising a current data provider timestamp;
calculating a current latency between the current data provider timestamp and a current data receiver timestamp;
calculating an expected timestamp for the current frame based on an expected latency between the current frame and a previous frame;
comparing the expected timestamp with the current data provider timestamp to determine that the pose data was lost; and
recovering the pose data based on the comparing.

16. The non-transitory computer readable storage medium of claim 15, wherein the method further comprises:
calculating a predicted pose based on previously determined pose data for the previous frame when the expected timestamp is greater than the current data provider timestamp.

17. The non-transitory computer readable storage medium of claim 15, wherein the method further comprises:
calculating a ratio of interpolation based on the current data receiver timestamp, the current data provider timestamp, and a previous timestamp when the expected timestamp is less than the current data provider timestamp.

18. The non-transitory computer readable storage medium of claim 17, wherein the method further comprises:
calculating a difference between the expected timestamp and the previous timestamp; and
calculating a difference between the current data provider timestamp and the previous timestamp.

19. The non-transitory computer readable storage medium of claim 15, wherein the method further comprises:
storing the current pose data, the current data provider timestamp, and the current latency.

20. The non-transitory computer readable storage medium of claim 15, wherein the method further comprises:
retrieving previous pose data for the previous frame received from the data provider, the previous pose data comprising a previous timestamp.

* * * * *